June 2, 1970  R. M. VAN GINHOVEN ET AL  3,515,058
FORK FEED BALER
Filed March 1, 1968  3 Sheets-Sheet 3
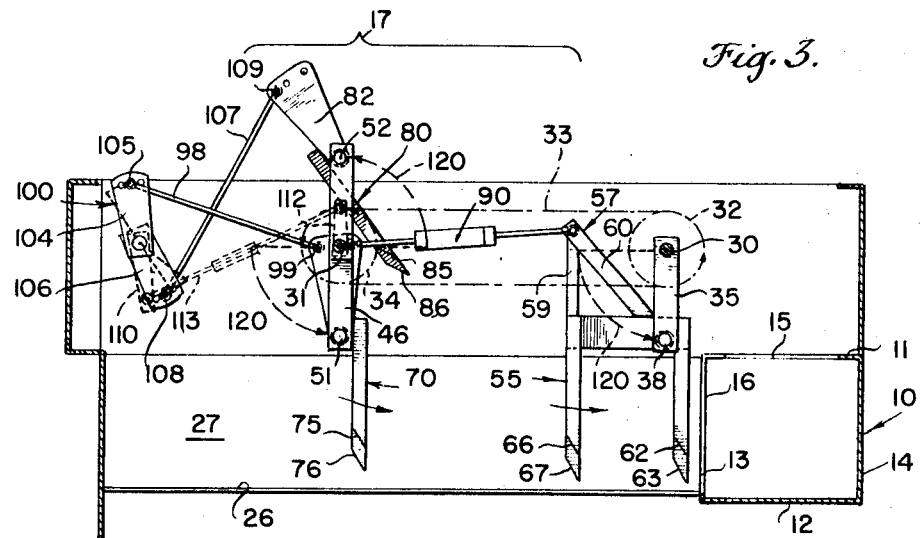
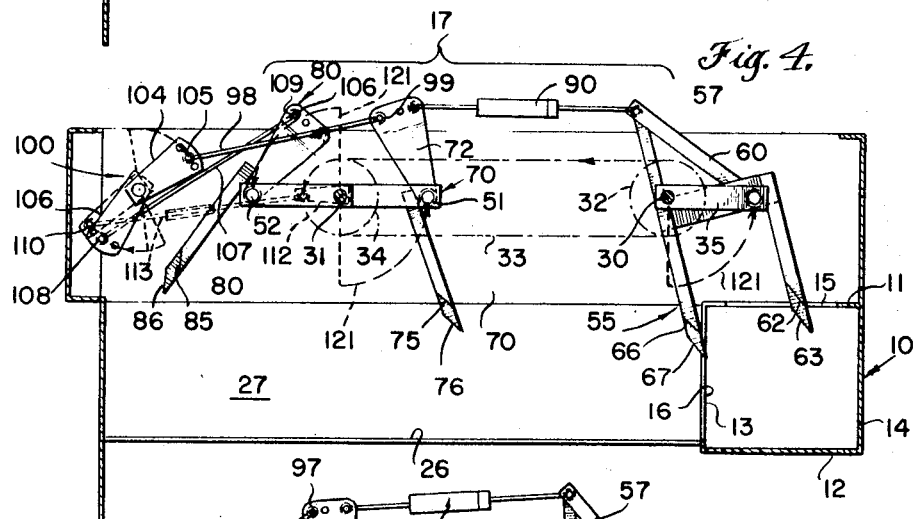
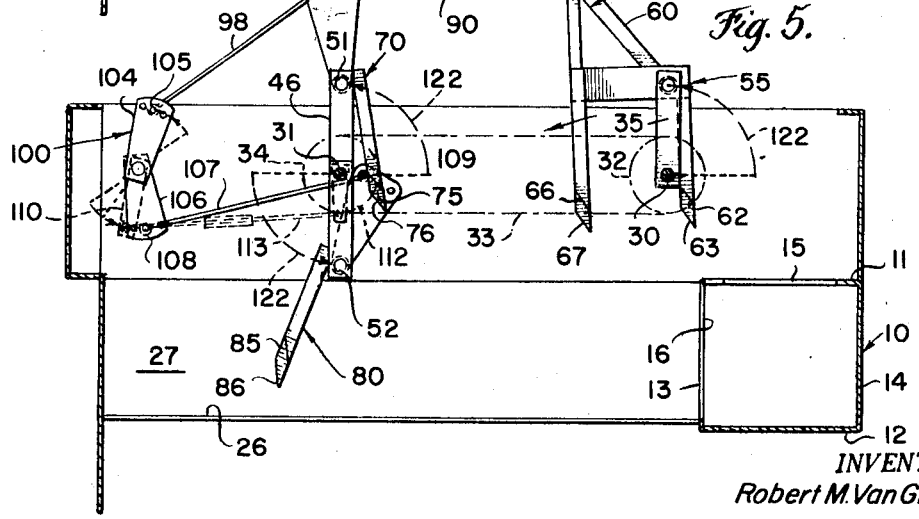
INVENTORS
Robert M. Van Ginhoven
Edwin B. Nolt
BY
ATTORNEYS United States Patent Office 3,515,058
Patented June 2, 1970

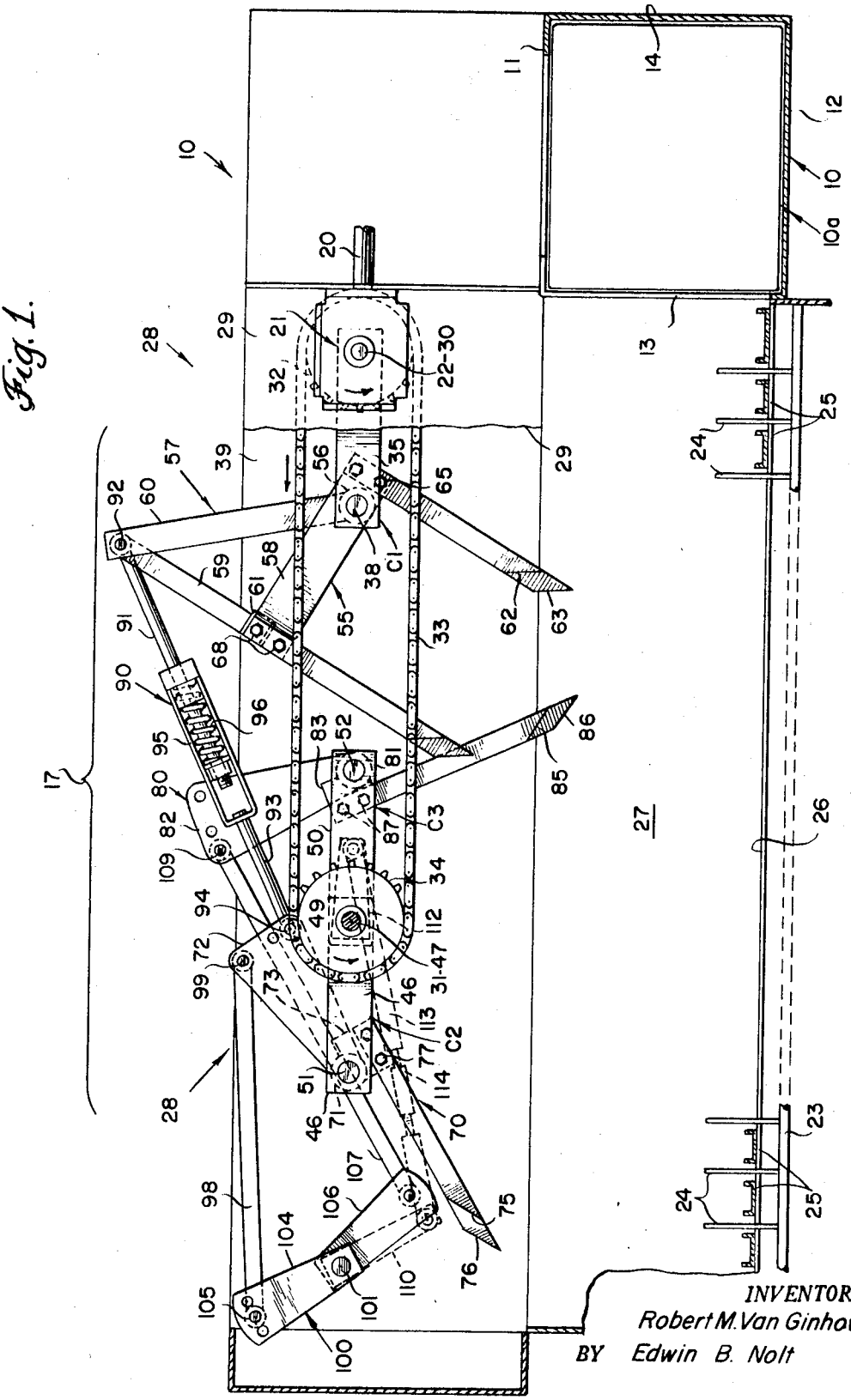

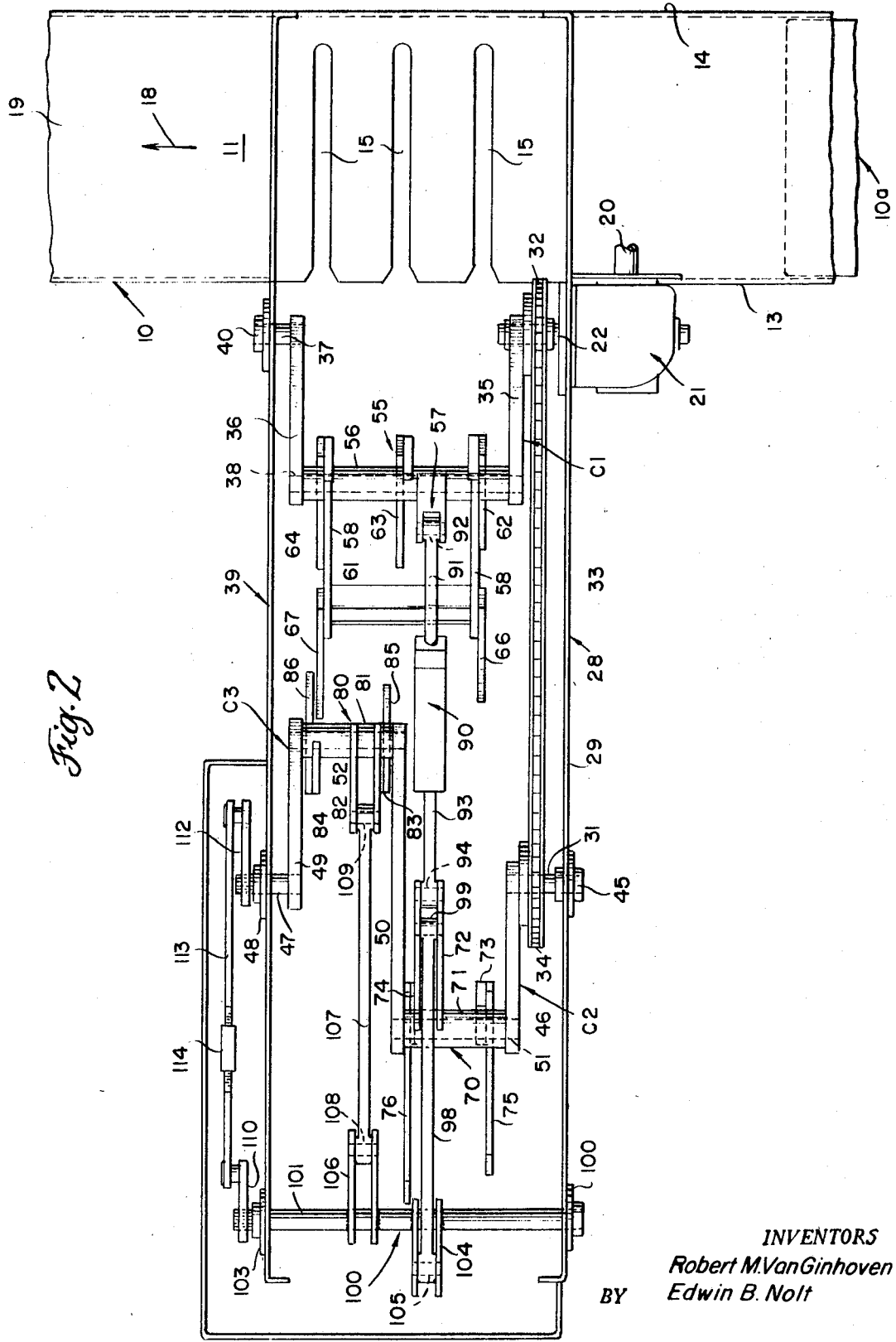

3,515,058
FORK FEED BALER
Robert M. Van Ginhoven, Lancaster, and Edwin B. Nolt, New Holland, Pa., assignors to Sperry Rand Corporation, New Holland, Pa., a corporation of Delaware
Filed Mar. 1, 1968, Ser. No. 709,715
Int. Cl. B30b 1/00, 15/20
U.S. Cl. 100—189                  19 Claims

ABSTRACT OF THE DISCLOSURE

A hay baler infeed mechanism for supplying hay to a bale chamber having a reciprocable plunger, wherein an alternate pickup feed sweep of only a part of the width of the hay platform of the pickup chamber is made at any one time by plural sets of outer feed fingers each of which cooperate with a corresponding set of inner bale chamber feed fingers of an inner feed assembly; and, the attitude of all of such feed fingers are controlled by linkage mechanisms connected to a common actuator.

Summary of the invention

This invention relates to hay balers, and more particularly to an improved mechanism for sweeping hay into a bale chamber.

The conventional hay baler is towed by a tractor across a field and has an elongated rotating pickup assembly for picking up hay or other material as the baler is moved along a windrow. The hay or other material is swept upwardly from the ground by the pickup assembly and deposited on a transverse receiving table or a pickup platform disposed immediately behind the pickup assembly. Feed fingers sweep the length of the hay receiving platform, pushing hay through an opening in a bale chamber which is disposed transversely to the length of the hay receiving platform. The hay passed into the bale chamber is compressed and pushed backwardly by a reciprocating plunger which progressively compacts all hay pushed into the bale chamber to form a bale which is subsequently bound by twine, tied and ejected from the other end of the bale chamber.

One of the major problems in baler design has been the feed mechanism for sweeping the hay receiving platform and pushing hay into the bale chamber. The efficiency of this mechanism determines, to a large measure, the firmness and compactness of a bale.

One of the more efficient types of feed finger assemblies uses two sets of fingers or tines. The outer set sweeps the hay receiving platform moving the hay toward the inner set of feed fingers. An inner or first set of feed fingers receives the hay from the outer set of feed fingers and pushes it directly into the bale chamber. The inner feed finger assembly is synchronized to cooperate with the outer feed fingers, and with the reciprocating bale plunger.

One of the major advantages of this type of unit is the pressing of the crop material in the bale chamber by the inner feed finger assembly prior to the stroke of the bale plunger. However, in previous units of this type, the hay material is fed intermittently rather than smoothly to the bale chamber. Also the fingers of the inner feed finger assembly have a tendency to wedge the crop material up against the top wall of the bale case, which often brings about breakdown of the unit.

Accordingly, it is an object of this invention to provide a hay baler with an improved type of feed mechanism.

It is a further object of this invention to obtain a smooth uninterrupted flow of hay or crop material to the bale chamber, to more efficiently compact it therein prior to the stroke of the bale plunger.

It is a still further object of this invention to provide a bale feeder mechanism where plural sets of outer feed fingers successively sweep different portions of the width of the hay receiving platform.

It is a still further object of this invention to provide an inner feed finger assembly which coacts with all sets of the outer feed fingers to push the swept hay or other crop material into the bale chamber.

It is a still further object of this invention to effectively control the relative orientation of all of the fingers of the various sets of feed assemlies to more efficiently interact with each other, and to preclude wedging of the crop between the various sets of fingers or with the bale chamber.

It is a still further object of this invention to provide a crank operated dual feed outer assembly unit, the sets of fingers of which, are out of phase and alternately sweep different portions of the width of the hay receiving platform.

It is a still further object of this invention to provide a crank operated inner feed assembly having plural sets of fingers in tandem on a common frame which coact with the outer feed assembly to grasp the swept crop material and push it into the bale chamber in front of the bale plunger.

Further objects and advantages of this invention reside in the details of construction, arrangement, combination of the various parts of the apparatus hereinafter more fully set forth in the accompanying drawings and specification and as specifically pointed out in the claims.

Description of the drawings

FIG. 1 is a front elevational view of a hay baler taken in section through the bale case and the rotatable crop pickup mechanism, with the side plate of the feed finger assembly cut away to show the feed finger assemblies for sweeping the crop receiving platform;

FIG. 2 is a top view of the hay baler showing the feed finger assemblies;

FIG. 3 is a diagrammatic elevation of the baler unit similar to FIG. 1, showing the parts positioned when the cranks have been rotated counterclockwise ninety degrees (90°) from the position of FIG. 1;

FIG. 4 is a view similar to that of FIG. 3 with the crank arms of the feed finger assemblies rotated one-hundred-eighty degrees (180°) from the position shown in FIG. 1; and FIG. 5 is an elevation view similar to that of FIG. 3 wherein the cranks of the feed finger assemblies have been rotated counterclockwise two-hundred-seventy degrees (270°) from the position of FIG. 1.

Detailed description

Referring particularly to the drawings and particularly to FIGS. 1 and 2, the bale case generally indicated by 10 is an elongated chamber rectangular in cross section which is disposed parallel to the ground and extends in a fore-and-aft direction with respect to the travel of the baler. It has a top wall 11, a bottom wall 12 and opposed walls 13 and 14. The portion of the top wall of the bale chamber immediately adjacent the feed finger assemblies, has a plurality of elongated slots 15, shown in FIG. 2 to permit feed fingers to pass through the top wall 11 of bale chamber 10. The side wall 13 of bale chamber 10 has an opening 16 immediately adjacent the feed finger assembly 17 through which the crop material and feed fingers pass to load the bale chamber 10 along the line of travel and in front of the reciprocable plunger 10a.

The reciprocable plunger 10a moves in the direction indicated by the arrow 18 across the bale chamber section adjacent the opening 16 to press the hay into the form of a bale in the aft section 19 of the bale chamber 10. Movement of the reciprocable plunger 10a has to be cyclically timed with that of the feed finger assembly so that the hay or crop material has passed into the bale chamber 10 through opening 16 by the feed finger assembly 17 between forward strokes of the reciprocable plunger 10a. The crop material fitted to the bale chamber is thereby progressively moved along the aft section 19 of the bale chamber 10, subsequently tied to form bales by well known tying devices.

Mechanical power is supplied to the feed finger assembly 17 by a power shaft 20 and a gearbox 21 disposed above the bale chamber 10.

Crop material is picked up off the ground by an elongated transversely extending rotatable pickup reel unit 23 having a plurality of tines 24 which pass between stripper plates 25, as shown in FIG. 1.

On rotation of the pickup reel 23, the tines 24 lift the crop material from the ground and place it onto the elongated transversely extending hay receiving platform 26 of the feed chamber 27. A typical pickup mechanism, similar to that used herein, is shown in U.S. Pat. 2,757,602.

This invention is directed to the feed finger assemblies generally designated 17 which sweep the crop material across the feed chamber 27 and into the bale chamber 10. The feed finger assembly has two separate feed finger units. An outer feed finger unit sweeps crop material across the feed chamber 27 toward the bale chamber 10. An inner group of feed fingers immediately adjacent the bale chamber pushes the swept crop material from the feed chamber and into the bale chamber in the position immediately in front of the reciprocable plunger which then presses the crop material into a bale after retraction of the inner feed assembly fingers from the bale chamber.

The bale housing 28 has its front plate 29 cut away in FIG. 1 to show the feed finger assembly 17.

The inner feed assembly is driven by the stub shaft 30 which is directly connected to the gearbox output shaft 22 which projects through the front plate 29. While the outer feed finger assemblies are driven by stub shaft 31, which is powered by a chain and sprocket assembly connected to the gearbox output shaft 22.

The toothed sprocket 32 is directly mounted on gearbox output shaft 22 immediately behind the feed finger assembly front plate 29, as shown in FIG. 2. Drive chain 33 extends over this wheel and over the driven sprocket wheel 34 which is integrally mounted on stub shaft 31.

The inner feed finger assembly unit is driven from the end 30 of shaft 22 by crank arm 35 and supported at its other side by follower crank arm 36, the latter of which is mounted on stub shaft 37 at its upper end. Crank arms 35 and 36 are connected at their lower ends by a crank pin 38 which supports the inner feed finger assembly.

The stub shaft 37 is rotatably supported on the feed finger housing rear plate 39 by bearing 40 and is disposed in direct alignment with drive shaft 30 as illustrated in FIG. 2.

This figure also illustrates that stub drive shaft 31 is mounted on the feed finger housing front plate 29 by means of a bearing 45 in which it is rotatably supported. Crank arm 46 supports the inner feed finger assembly at one side, and also provides for movement of the assembly because of its rigid connection to stub shaft 31.

Supporting stub shaft 47 is mounted on the feed finger housing rear plate 39 through bearing 48 in which it is rotatably mounted directly across from the stub shaft 31 on the front plate 29, as can be seen in FIG. 2. Depending crank arm 49 is rigidly connected to the end of the stub shaft 47 and supports the other side of the outer feed finger assembly unit.

It will be noted in referring to all of the figures that the outer feed finger assembly unit has two different sets of feed fingers which sweep the feed chamber, and that these sets of fingers are out of phase with each other.

Both sets of fingers are driven by the stub shaft 31 and the crank arm 46. A common support crank arm 50 has one end connected to crank arm 46 through a crank pin 51, and has its other end connected to the lower end of crank arm 49 by crank pin 52. Crank arms 46 and 49 face in opposite directions, so that one set of feed fingers mounted on crank pin 51 is disposed directly out of phase with a second set of outer feed fingers mounted on crank pin 52.

The inner feed finger crank assembly including the crank arms 35, 36 and connecting pin 38 will be referred to as crank C–1; the crank assembly for the forward set of outer feed fingers, which includes the crank 46, connecting bar 50 and connecting and crank pin 51 will be referred to as crank C–2; similarly, the rearward set of outer feed fingers supported by cranks 49 and 50, and connecting pin 52 will be referred to as crank C–3. Accordingly, oppositely disposed stub shafts 30 and 31 form the crank shaft for crank C–1, while oppositely disposed stub shafts 31 and 47 comprise the crank shaft for crank C–2 and C–3.

The inner feed finger assembly unit, disposed immediately adjacent the bale chamber 10, is rotatably supported on crank pin 38. This inner feed finger assembly generally indicated at 55 has feed finger mounting plates 58 disposed immediately adjacent each of the cranks 35 and 36 which are integrally connected adjacent their forward ends to the pivotable sleeve 56. An attitude control bracket 57 for the feed finger assembly 55 includes upright members 59 and 60 which are joined together at their upper ends. The lower end of member 60 is integrally connected to the pivotable sleeve 56, while the lower end of member 59 is integrally connected to cross member 61 which connects the rearward portions of the two finger support members 58.

The front feed fingers include fingers 62, 63, and 64. Fingers 62 and 64 are detachably connected by bolts 65 to the front of their respective feed finger support member 58, while depending finger 63 is supported midway between fingers 62 and 64 and is directly connected to sleeve 56 by bolts. Depending rear fingers 66 and 67 are secured to the rear ends of the finger support members 58. Finger 56 is supported on the finger support member adjacent crank 35, while depending finger 67 is bolted to the finger support plate 58 adjacent the depending crank 36.

The outer feed finger assembly has a front feed finger unit generally indicated at 70 rotatably mounted on the crank pin 51 of the crank assembly C–2. A rotatable sleeve 71 is mounted on the crank pin 51 and has an upstanding attitude control bracket 72 integral therewith. The sleeve has lugs 73 and 74 respectively adjacent crank arms 46 and 50. Depending finger 75 is removably fastened to lug 73, while depending finger 76 is removably fastened to lug 74. In both instances, a pair of spaced bolts 77, shown in FIG. 1, are used.

The outer feed finger assembly has a rear feed finger assembly 80 which is out of phase with its counter-part feed finger assembly 70. The construction is similar to that of the feed finger assembly 70 and consists of a pivotable sleeve 81 disposed on crank pin 52, an upstanding attitude control bracket 82 integral therewith, and spaced depending tooth carrying lugs 83 and 84 integral also with sleeve 81. Depending lugs 83 and 84 are respectively adjacent cranks 50 and 49 of crank assembly C–3, and respectively support depending teeth 85 and 86. Each of the feed fingers are secured to their corresponding support lug by a pair of bolts 87.

In referring to FIG. 2, it will be noted that all of the feed fingers of the inner feed finger assembly move together and the entire width of the feed chamber 27 is covered. However, the outer feed finger assembly which sweeps the major portion of the length of the feed chamber 27, has two separately operating feed units which are out of phase. The front outer feed finger assembly 70 sweeps the front half of the width of the feed chamber, while the rear feed finger assembly 80 sweeps the rearmost half of the width of the feed chamber.

In addition to the movement imparted to the feed finger units 55, 70 and 80 by their respective crank assemblies, C-1, C-2, and C-3, the orientation of the units are controlled by individual attitude control mechanisms.

The inner feed finger assembly has a connecting linkage generally indicated at 90 with an upper elongated rod 91 connected at its end through pin 92 to the attitude control link 60 of the feed finger unit 55. A lower link 93 is connected through pin 94 to the attitude control link 72 of the outer feed finger assembly 70. A compression spring and housing unit 95, having a compression spring 96 provides a spring loaded connection between rods 91 and 93 which will allow for yielding of the feed finger unit 55 when overload conditions are encountered.

An activating connecting rod 98 is connected to the attitude control bracket 72 through pin 99, and has its movement controlled by the articulation assembly generally indicated at 100. This assembly includes the rock shaft 101 which is mounted at each end and bearings 102 and 103 respectively supported by the feed finger housing front plate 29 and the feed finger housing rear plate 39.

The connection between the rock shaft 101 and the attitude actuating rod 98 is made by an upstanding parallel plate bracket unit 104 integrally connected with the rock shaft 101 and connected through pin 105 to the actuation rod 98. It will be noted that the attitude actuation rod 98 controls the movement of both the inner feed finger unit 55, and the front outer feed unit 70, because of the common connection to the upstanding double plate bracket 72.

In similar fashion, the attitude of the rear outer feed finger unit 80 is controlled by the rock shaft 101 through the upstanding plate bracket assembly 106 which supports actuation rod 107 connected thereto through pin 108. The other end of actuating control rod 107 is connected to the upstanding bracket plates 82, and 83 through the pin 109. Movement of the bracket plates 82 and 83 will rotate the finger support sleeve 81 on its crank pin, thereby changing the angular orientation of the feed fingers 85 and 86.

Movement of the attitude actuation assembly unit 100 is controlled by the short outboard lever 110 which is mounted directly to the rock shaft 101. Movement of the outboard lever 110 is directly controlled by rotation of crank shaft outboard lever 112 which is directly connected to the stub shaft 47 of crank assembly C-3. A connecting rod unit having a turnbuckle 114 connects the outboard levers 110 and 112.

Rotation of the outboard power link 112 will cause reciprocable movement of the connecting rod unit 113 thereby causing the outboard lever 110, and consequently the rock shaft 101 to oscillate. Because of this oscillation, it can be seen that the rock shaft will also cause an oscillation or rocking movement of the finger supporting sleeve members 56, 71 and 80.

In referring to FIG. 1, it should be noted that in each set of feed fingers, the fingers closest to the front of the pickup chamber 27 are shorter in length. For example, fingers 62 and 66 of the inner feed finger unit are shorter than the corresponding fingers 63 and 67. This is also true in the outer feed finger assembly, where fingers 75 and 85 are shorter than fingers 76 and 86. This arrangement is desirable but not essential.

Operation

The entire feed finger assembly unit is powered by the output shaft 22 of the gearbox 21. The end 30 of shaft 22 is directly connected thereto and powers the inner feed finger crank C-1. The chain and sprocket assembly rotates stub shaft 31 which is directly connected to the outer feed finger crank units C-2, and C-3. Also, the feed finger attitude control assembly 100 has its oscillating rock shaft 101 powered by direct connection to the output shaft 47 of crank assembly C-3.

FIGS. 1, and 3 through 5 inclusive, illustrate a complete cycle of the entire feed finger assembly unit. It will be noted that rotation of the crank assemblies determine the position of the feed finger unit connected thereto, while the angular inclination or attitude of the feed fingers is determined by the actuation linkage connected thereto and moved by the oscillating rock shaft 101.

Specifically, as the output shaft 22 is driven in a counterclockwise direction, crank assembly C-1, including crank arms 35 and 36, are also driven in a counterclockwise direction thereby moving the inner feed finger assembly in a counterclockwise movement travelling as shown from the position of FIG. 1 downwardly into the feed chamber 27, across and into the bale chamber 10, and up through and out of the top of the bale chamber to complete its circular movement. The path taken can readily be seen in FIGS. 3, 4 and 5. Essentially this movement of the inner feed finger assembly engages the crop material swept across the feed chamber receiving platform 26 and pushes it into the bale chamber, immediately in front of the reciprocating bale forming plunger 10a. During the counterclockwise movement of the inner feed finger unit 55, the inclination or attitude of the fingers is controlled by movement of the attitude actuation rod assembly 90 which is pivotally connected to the feed finger assembly 55 through the support bracket members 59 and 60.

The counterclockwise rotation of the output shaft 22 also drives stub shaft 31 counterclockwise through the sprocket and chain assembly, thereby moving crank arm 46 and both crank assemblies C-2 and C-3, which are connected to each other, and control the outer feed finger units in a counterclockwise direction. Movement of the outer feed finger units will sweep the crop material across the crop receiving platform 26 from left to right and to a position where it is engaged by the inner feed finger assembly for subsequent movement into the bale chamber 10.

It will be noted that the front outer feed finger assembly 70 comprising feed fingers 75 and 76 are moved in unison with the fingers of the inner feed finger assembly 55. The crank arms 46 and 35 which respectively control rotational movement of the feed finger units 70 and 55 move in phase with each other, as can be seen in drawings 3 and 5.

However, the rearwardly disposed outer feed finger unit 80 moves in its counterclockwise path out of phase with both the front outer feed finger unit 70 and the inner feed finger unit 55.

The orientation or attitude of the outer feed finger units 70 and 80 are respectively controlled by the attitude control links 98 and 107. Link 98 is pivotally connected to the attitude control brackets 72 of front finger assembly 70, while attitude control link 107 is pivotally connected to the bracket 82 of the rear outer feed finger unit 80.

Movement of both of these rods is controlled by the oscillation movement of rock shaft 101, which has a period of movement identical with that of the crank assemblies C-1, C-2 and C-3, since it is directly powered by movement of the stub shaft 47 of crank unit C-3.

Thus, there is a dual movement of the feed finger units, caused first by the movement of their respective crank assemblies which carries them through a circular path of movement, and secondly because of the movement of the rocking assembly 100 which is directly connected to the feed finger assemblies.

The motion of the feed finger assemblies with respect to each other is clearly shown in FIGS. 1, 3, 4 and 5, which successively show counterclockwise rotation at ninety degrees (90°) intervals.

In FIG. 1, the inner feed finger unit 55 is descending into the right hand portion of the feed chamber 27, while the front outer feed finger unit 70 is about to begin its sweep of the feed chamber 27 from left to right. The rearward outer feed finger unit 80 has just completed its sweep stroke. Note that the angular disposition of the feed fingers is controlled in all of the instances by the rock assembly 100. In FIG. 1, the bracket unit 105 has swept to its furthermost position away from the feed finger assembly, pulling link 98 with it. However, this swing is considerably less than that of the crank arms of the feed finger units as they rotate, and as seen in FIG. 1, restricts movement of the bracket plate 82 so that it is disposed on the right hand side of crank pin 51, thereby tilting the lower ends of fingers 75 and 76 to the extreme left position. Similarly, the connecting actuating rod assembly 90, associated with the feed finger unit 55, acts upon the feed finger unit 55 to effect a tilting of the lower ends of the feed fingers, of this unit toward the left as viewed in FIG. 1.

In FIG. 3, the feed finger units are disposed at a point ninety degrees (90°) counterclockwise from that of FIG. 1. The feed finger unit 55 has moved completely into the feed chamber 27, engaging the crop material deposited by the outer feed finger assembly 70 in its previous sweep, and that crop material deposited by the rear outer feed finger assembly 80 in its immediately completed sweep shown in FIG. 1. In this instance, it will be noted that the attitude control linkage arrangements position the feed fingers of feed finger units 55 and 70 in a vertical position.

In FIG. 4, the inner feed finger unit 55 is shown as having completed its sweep of crop material into the bale chamber 10, thereby completing the delivery stroke of its counterclockwise rotational cycle. Similarly, front outer feed finger unit 70 is shown moving out of the feed chamber 27, on completion of the crop sweeping stroke across the feed chamber from left to right, and the beginning of the return portion of its counterclockwise line of travel. The rear outer feed finger unit 80 is about to begin its sweeping stroke of the crop feed chamber 27. Note that the rock shaft assembly 100 has moved the articulation control bracket 104 to its furthest right hand position, pushing the attitude actuation links 98 and 90 to their furthest right hand position, compensating for the action of links 46 and 35. This will slightly pivot the front outer feed unit 70, and the inner feed finger unit 55 on their respective crank pins, 51 and 38 to incline the lower ends of the feed fingers toward the right at the end of the feed stroke of these finger units.

The ninety degree (90°) arc of travel of the crank arms 35 and 46 from the position of FIG. 3, is shown by the dotted line arcs 121. A dotted outline of the wheel and sprocket units is also shown.

The outer feed finger unit 80 is shown about to begin its stroke, with the attitude control bracket 106 at its furthest point away from the bale chamber, and connected to link 107 and bracket unit 82 to give the desired inclination to the feed fingers 85 and 86.

In FIG. 5, the inner feed finger unit 55, and the outer front feed finger unit 70 have completed three-quarters of their stroke, having moved ninety degrees (90°) from the position shown in FIG. 4. The movement of the crank arms 35 and 46 is shown by dotted outline 122. Both of these crank arms are now in the direct vertical position. The articulation control bracket 105 has completed half of its return stroke, and the relative position of this bracket and the crank pins 52 and 81 return the feed fingers to approximately a vertical position.

The rear outer feed finger unit 80 is beginning its sweeping stroke across the pickup chamber 27. When the feed finger units are in this position and in that shown in FIG. 1, the reciprocable plunger is clearing the bale chamber immediately adjacent the feed opening 16.

It will be noted that the inner feed finger unit 55, sweeps the entire width of the bale chamber simultaneously, while the front feed finger unit 70, and the rear feed finger unit 80 of the outer feed finger assembly alternately sweep half the width of the pickup chamber 27.

Feed finger units 70 and 80 are out of phase, and successively sweep crop material toward the bale chamber, providing a continuous movement of crop material.

This feed finger unit assembly allows more crop material to be received on the crop receiving platform 26, because of its alternate sweep of half the width of the chamber. In effect, two sweep strokes are made providing a continuous flow of crop material to the bale chamber, as contrasted to the previous intermittent feeds.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

What we claim is:
1. A hay baler, comprising:
 (a) a hay receiving platform, the width of said platform being the distance from the receiving end to the back;
 (b) a bale casing adjacent said platform into which hay is received and which has a feed opening facing said platform;
 (c) inner feed means for pushing hay into said bale casing through said feed opening;
 (d) outer feed means for sweeping hay along said platform towards said bale casing in a continuous, plural, split stroke feed cycle with respect to said inner feed means, to a point where it is picked up by said inner feed means;
 (e) said outer feed means including plural sets of feed finger units, each of said units sweeping a different portion of the width of said platform, each of said units being laterally offset from the other of said units.

2. The automatic hay baler as set forth in claim 1, wherein:
 (a) said outer feed means has two sets of feed finger units which each sweep one-half the width of said platform and are out of phase with respect to each other.

3. The hay baler as set forth in claim 1, wherein:
 (a) said inner feed means operates in phase with one of said outer feed finger units.

4. The hay baler as set forth in claim 1, wherein:
 (a) said feed finger units of said outer feed means each including a plurality of fingers, the attitudes of the fingers of each of said units being varied with respect to the attitudes of the fingers of the other of said units; and
 (b) one of said outer feed finger units is in phase with said inner feed means.

5. The hay baler as set forth in claim 1, wherein:
 (a) said inner feed means includes a single feed stroke frame including a plurality of units, each unit including a plurality of teeth, the attitude of said teeth of each of said units being varied during the course of the feed stroke.

6. The hay baler as set forth in claim 5, wherein:
 (a) the stroke range of said outer feed means overlaps the stroke range of one of said units of said inner feed means.

7. The hay baler as set forth in claim 5, wherein:
 (a) said teeth of said inner feed means nearest the hay receiving end of said platform having a greater vertical clearance between said platform and the lower ends thereof than the lower ends of the other said teeth.

8. An automatic hay baler, comprising:
(a) a hay receiving platform;
(b) a bale casing adjacent said platform into which hay is received and which has a feed opening facing said platform;
(c) inner feed means including a plurality of depending fingers for pushing hay into said bale casing through said feed opening;
(d) outer feed means including a plurality of depending fingers for sweeping hay along said platform toward said bale casing to a point where said hay is picked up by said inner feed means; and
(e) attitude control means common to both said outer feed means and said inner feed means for varying all of said fingers so that the lower ends of said feed fingers have a longer arcuate path during their work stroke, said attitude control means including a single arm connecting to both said outer feed means and to said inner feed means.

9. The hay baler as set forth in claim 8, wherein:
(a) said attitude control means includes a rock shaft assembly which is connected at one end to said inner feed means and at the other end to said outer feed means, said rock shaft assembly controlling the attitude of all of said depending fingers.

10. The hay baler as set forth in claim 9, wherein:
(a) said inner feed means and said outer feed means have the same period of movement; and
(b) said attitude control assembly is operatively connected to one of said feed means and has the same period of movement as both the inner feed means and the outer feed means.

11. A hay baler, comprising:
(a) a hay receiving platform;
(b) a bale casing adjacent said platform into which hay is received and which has a feed opening facing said platform;
(c) inner feed means including a plurality of depending elongated feed fingers for pushing hay into said bale casing through said feed opening;
(d) outer feed means including a plurality of depending elongated feed fingers for sweeping hay along said platform toward said bale casing to a point where it is picked up by said inner feed means;
(e) said feed fingers being arranged in groups substantially along a transverse line across the width of said platform; and
(f) the feed fingers of each group nearest the hay receiving end of said platform having a greater vertical clearance between the platform and the lower ends thereof than the lower ends of the other feed fingers.

12. The hay baler as set forth in claim 11, wherein:
(a) the feed fingers of said inner feed means are arranged in two longitudinally spaced groups of fingers.

13. A hay baler, comprising:
(a) a hay receiving platform;
(b) a bale casing adjacent said platform into which hay is received and which has a feed opening facing said platform;
(c) an inner feed means including a plurality of feed fingers rotatably carried on a rotating crank assembly, for pushing hay into said bale casing through said feed opening, and simultaneously sweeping the entire width of the hay receiving platform;
(d) outer feed means including a front feed finger unit, and a rear feed finger unit which are mounted on separate crank assemblies, for alternately sweeping hay along the respective widths of said hay receiving platform toward said bale casing in a continuous, plural, split stroke feed cycle with respect to a point where it is picked up by said inner feed means; and
(e) the fingers of said inner feed means, and the fingers of said front feed unit of said outer feed means being in phase.

14. The hay baler as set forth in claim 13, wherein:
(a) actuation control means is connected to said inner end to said outer feed finger means for varying the attitude of said feed fingers to obtain a longer arc of travel of the feed strokes thereof.

15. The hay baler as set forth in claim 13, wherein:
(a) said attitude control assembly includes an oscillating rock shaft which is connected to each of said feed finger units.

16. The hay baler as set forth in claim 13, wherein:
(a) the inner feed means and the outer feed means are moved by crank arms of substantially the same length which rotate in phase with each other.

17. The hay baler as set forth in claim 16, wherein:
(a) the feed fingers of each of said feed finger means are rigidly supported on a sleeve which is pivotally mounted on the end of said cranks.

18. The hay baler as set forth in claim 17, wherein:
(a) oscillating attitude control means is connected to said sleeves to vary the attitude of said feed fingers.

19. The hay baler as set forth in claim 18, wherein:
(a) the same angular velocity is imparted to each of said cranks from a power input shaft; and
(b) said attitude control means includes a rock shaft which is connected to one of said crank units, and has the same period of movement as said crank units.

References Cited
UNITED STATES PATENTS

| | | | |
|---|---|---|---|
| 3,351,002 | 11/1967 | McDuffie | 100—189 |
| 3,044,243 | 7/1962 | Wenzel | 100—142 XR |

PETER FELDMAN, Primary Examiner

U.S. Cl. X.R.

56—341; 100—142